United States Patent [19]

Kawada et al.

[11] 4,322,671
[45] Mar. 30, 1982

[54] INDUCTION MOTOR DRIVE APPARATUS

[75] Inventors: Shigeki Kawada, Hino; Hiroshi Ishida, Hamura; Yutaka Koiwai, Tokyo, all of Japan

[73] Assignee: Fujitsu Fanuc Limited, Tokyo, Japan

[21] Appl. No.: 107,088

[22] Filed: Dec. 26, 1979

[30] Foreign Application Priority Data

Dec. 30, 1978 [JP] Japan .................... 53-164135

[51] Int. Cl.$^3$ .............................................. H02P 5/40
[52] U.S. Cl. ..................................... 318/798; 318/811; 318/801
[58] Field of Search ............... 318/803, 802, 810, 808, 318/811, 798, 801

[56] References Cited

U.S. PATENT DOCUMENTS 3,819,992  6/1974  Opal ..................................... 318/808
4,160,940  7/1979  Wolf ..................................... 318/808

Primary Examiner—David Smith, Jr.
Attorney, Agent, or Firm—Staas & Halsey

[57] ABSTRACT

An induction motor drive apparatus brings the actual speed of an induction motor into coincidence with a command speed by varying the frequency and effective value of a three-phase AC voltage applied to the induction motor and limits the torque of the induction motor in the low speed region by controlling an amplitude of a speed deviation signal below a prescribed value. The apparatus includes an inverter for generating three-phase AC voltage, a speed deviation signal generator, a torque limit signal generator, an amplitude controller for controlling the amplitude of the speed deviation signal based on the presence of the torque limit signal, a slip signal generator which generates a slip signal having a positive or negative constant voltage conforming to the rotational direction of the induction motor, an adder for adding together a voltage signal which conforms to the actual speed and the slip signal, a rectangular waveform signal generator, a multiplier for multiplying an output of the amplitude controller by an output of the adder and a pulse width modulator. The rectangular waveform signal generator is adapted to produce a three-phase rectangular signal whose frequency is proportional to the output voltage value of the adder. The rectangular signal of each phase is modulated in pulse width on the basis of the speed deviation, the inverter being controlled by each resulting pulse-width modulated rectangular signal to thereby vary the effective value of the three-phase AC voltage and to make the speed of the induction motor constant.

14 Claims, 12 Drawing Figures

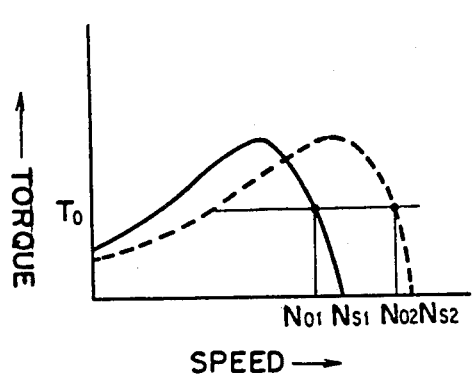
Fig. 1
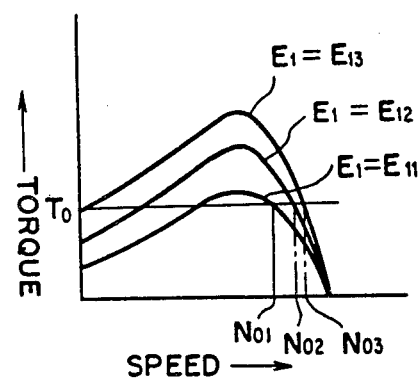
Fig. 2
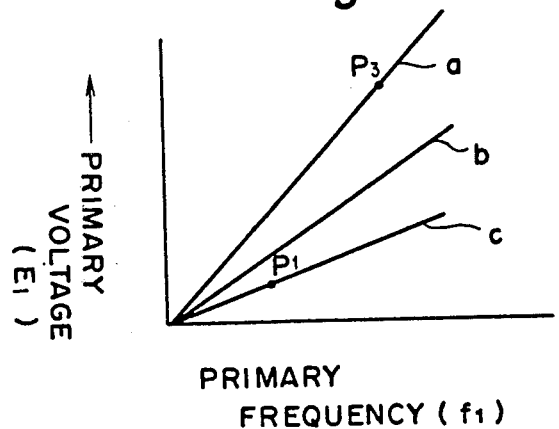
Fig. 3
Fig. 6
|   | F1 | F2 | F3 |
|---|----|----|----|
|   | 0  | 0  | 0  |
|   | 1  | 0  | 0  |
|   | 1  | 1  | 0  |
|   | 1  | 1  | 1  |
|   | 0  | 1  | 1  |
|   | 0  | 0  | 1  |
|   | 0  | 0  | 0  |

INDUCTION MOTOR DRIVE APPARATUS

BACKGROUND OF THE INVENTION

1. Field of the Invention

The present invention relates to an induction motor drive apparatus, and more particularly to an induction motor drive apparatus that allows smooth rotation of an induction motor in a low torque and low speed region, such as for mounting a tool on the spindle of a machine.

2. Description of the Prior Art

An operating mode referred to as an orientation mode is adopted when a tool is to be mounted on the spindle of a machine. In this orientation mode, the mounting of the tool on the spindle is performed as follows. Firstly, the spindle is rotated slowly until the respective cutting portions which are formed on both the tool and on the hand portion of the spindle are aligned face to face. At the time when one cutting portion faces the other, the rotation of the spindle is stopped. Then the tool is fixedly mounted on the spindle. Herein, it is considered that one cutting portion faces the other when a pin that projects from the spindle in the orientation mode strikes a stop.

In the above orientation mode, the motor has to rotate smoothly with a suitable driving torque because the spindle and other equipment may be damaged if the driving torque is too large, and not only is the secure operation of mounting of the tool on the spindle not assured, but also the efficiency of machining is lowered, if the driving torque is too small.

So in the orientation mode it is necessary to generate the driving torque whose magnitude is in the range of one third to one half of the driving torque in the cutting mode.

Now, as the motor for driving the spindle, it is possible to utilize DC motors and AC induction motors. From a standpoint of ease of control, a DC motor is efficient because a low speed and low torque control. However, a DC motor has many disadvantages, such as the difficulty of the maintenance of the commutators and brushes, the complexity in construction, the large scale size and high cost. Accordingly, if an induction motor can be utilized instead of a DC motor as the spindle motor, the disadvantages due to the DC motor are avoided. In this case, the following requirements must be satisfied.

(a) In the orientation mode, that is to say in the low torque region the induction motor must rotate smoothly, and (b) The induction motor must rotate with a suitable driving torque so as not to damage the spindle etc., when the pin strikes the stop.

SUMMARY OF THE INVENTION

In brief, the present invention discloses an induction motor drive apparatus that allows smooth rotation of an induction motor in a low torque and low speed region.

It is therefore an object of the present invention to provide an induction motor drive apparatus that allows smooth rotation of an induction motor in a low torque and low speed region.

It is another object of the present invention to provide an induction motor drive apparatus which easily allows the mounting of a tool on the spindle of the machine in the orientation mode.

It is still another object of the present invention to provide an induction motor drive apparatus that can prevent damage to the spindle etc., when a pin projecting from the spindle strikes a stop in the orientation mode.

It is yet another object of the present invention to provide an induction motor drive apparatus that can lower the driving torque of an induction motor in a low speed region or in the orientation mode to one third to one half of that in a high speed region or in a cutting mode.

Other features and advantages of the invention will be apparent from the following description taken in connection with the accompanying drawings.

BRIEF DESCRIPTION OF THE DRAWINGS

FIG. 1 is a graph useful in explaining torque-speed characteristics of an induction motor when the primary frequency change;

FIG. 2 is a graph useful in explaining torque-speed characteristics of an induction motor when a primary voltage applied thereto is changed;

FIG. 3 is a graph useful in explaining primary voltage-primary frequency characteristics of an induction motor when controlled to vary voltage and frequency;

FIG. 6 is a table useful in explaining the operation of a ring counter for generating a three-phase rectangular wave;

DETAILED DESCRIPTION OF THE PREFERRED EMBODIMENTS

Figure 4:
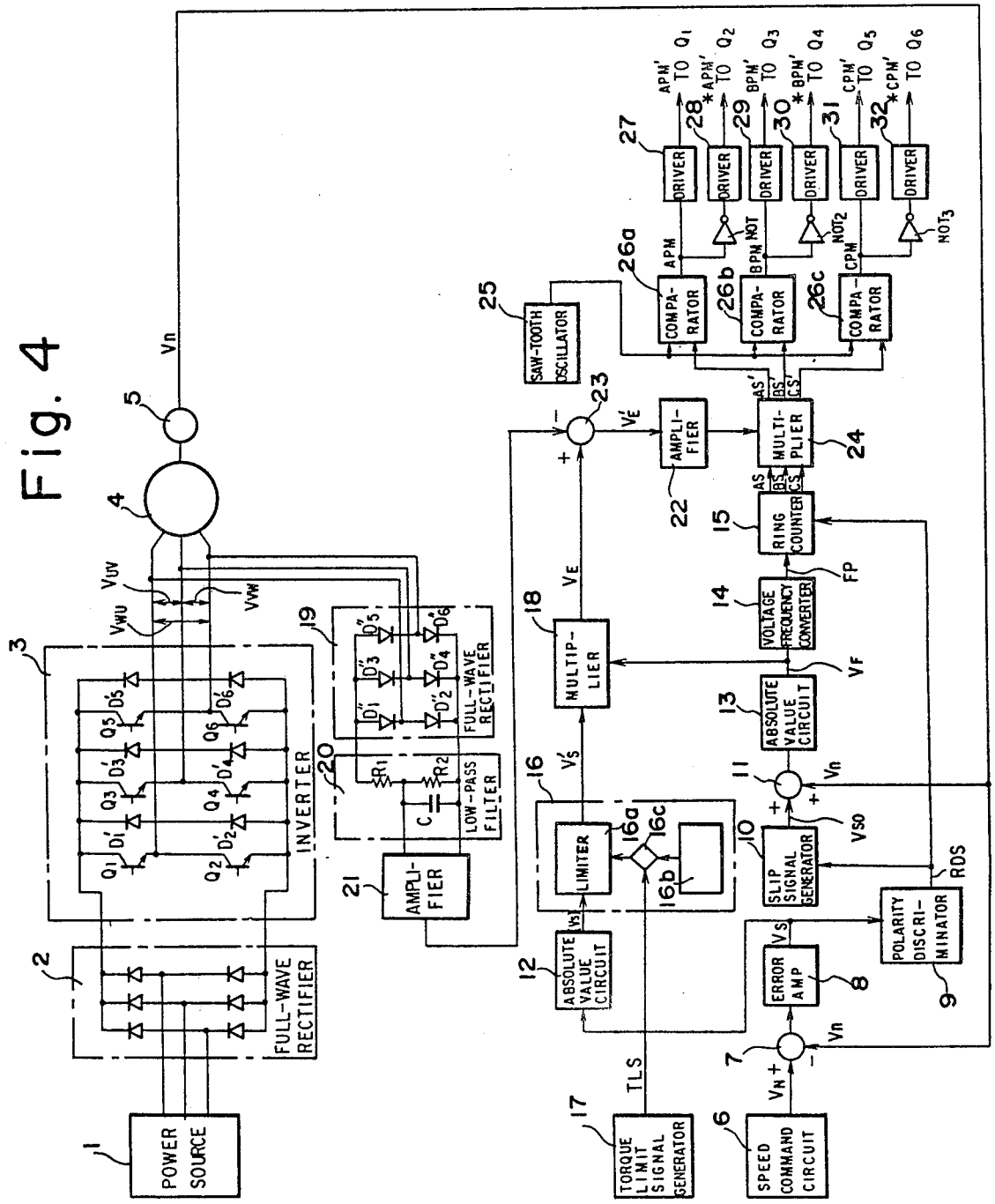
FIG. 4 is a circuit block diagram of an induction motor drive apparatus in accordance with the present invention.

FIGS. 1 through 3 are graphs which are useful in explaining the theory of speed control as it relates to induction motors. Specifically, FIG. 1 shows torque-speed characteristics in a case where the primary frequency of the motor is varied, FIG. 2 shows the torque-speed characteristics in a case where the primary voltage of the motor is varied, and FIG. 3 the primary voltage-primary frequency characteristics when the motor is subjected to variable voltage-variable frequency (VVVF) control.

An induction motor when supplied with three-phase AC voltage gives rise to a revolving magnetic field that drives a rotor. Under no-load conditions the induction motor will rotate at a substantially synchronous speed Ns but as the load increases the speed will assume a value N to produce a torque that conforms to the load. If we let $f_1$ represent the frequency of the three-phase AC voltage (the primary voltage) applied to the motor, and P the number of poles thereof, we have the relation $$N_s = 2f_1/P \ldots \qquad (1)$$

If we now make the synchronous speed of the induction motor $N_{s1}$, the torque-speed (T−S) characteristic thereof follows the curve indicated by the solid line in FIG. 1, from which it can be understood that the induction motor will rotate at a speed $N_{o1}$ if connected to a load that corresponds to a torque $T_o$. If the synchronous speed is now made $N_{s2}$ by changing the frequency $f_1$ of the primary voltage (i.e., by varying the primary frequency $f_1$), the T−S characteristic shifts to that indicated by the dotted line in FIG. 1, so that the induction motor rotates at the speed $N_{o2}$. In other words, the speed of the induction motor can be controlled by controlling the primary frequency $f_1$. On the other hand, holding the synchronous speed of the motor constant and varying the effective value $E_1$ of the primary voltage $E_1$ gives the curve illustrated in FIG. 2, where $E_{11}$, $E_{12}$ and $E_{13}$ are related by the inequality $E_{11} < E_{12} < E_{13}$. The graph shows that the induction motor will rotate at the speed $N_{o1}$ if the effective value of the primary voltage is $E_{11}$ and the load corresponds to the torque $T_o$. Thus, the speed of the motor will gradually increase to the points $N_{o2}$, $N_{o3}$ if the effective value of the primary voltage is varied to assume the values $E_{12}$, $E_{13}$ with the torque remaining constant at $T_o$. More specifically, changing the effective value $E_1$ of the primary voltage enables the speed of the induction motor to be controlled.

VVVF control may be explained as follows. The primary current $I_1$ of the induction motor and the generated torque T are respectively proportional to $E_1/f_1$ and $(E_1/f_1)^2$ in a speed range wherein the primary resistance drop can be neglected. Hence, if the primary frequency $f_1$ and effective value $E_1$ of the primary voltage are varied so as to remain in the same proportion to each other, the primary current $I_1$ and the generated torque T can be held constant while enabling the speed of the induction motor to be controlled in a continuous manner. This control is referred to as VVVF control. The relation between primary voltage $E_1$ and primary frequency $f_1$ in the case of VVVF control is shown by the straight lines in FIG. 3. Here the straight lines a, b and c respectively represent the $E_1 − f_1$ characteristics with the primary current $I_1$ held at three constant values $I_{11}$, $I_{12}$ and $I_{13}$, where the inequality $I_{11} < I_{12} < I_{13}$ holds. It should be noted that the torque T is proportional to the square of the primary current $I_1$, so that the straight lines a, b and c can also be considered as representing the $E_1 − f_1$ characteristics when the torque is held constant at the values $T_{11}$, $T_{12}$ and $T_{13}$, where the inequality $T_{11} < T_{12} < T_{13}$ holds.

After all, changing the primary frequency $f_1$ or the effective value of the primary voltage $E_1$ enables the speed of the induction motor to be controlled and changing together the primary frequency $f_1$ and the primary voltage $E_1$, in the same proportion to each other, enables the speed of the induction motor to be controlled keeping the driving torque constant.

Further, high torque is generated in a high speed region and low torque in a low speed region respectively by controlling the primary frequency and the effective value of the primary voltage so as to satisfy the following inequality.

$$E_1(H)/f_1(H) > E_1(L)/f_1(L)$$

Herein, $f_1(H)$, $E_1(H)$ indicates respectively the primary frequency and the effective value of the primary voltage in the high speed region and $f_1(L)$, $E_1(L)$ the primary frequency and the effective value of the primary voltage in the low speed region. That is to say, if in the high speed region the operating point of the induction motor is located at the point $P_3$ on the straight line c of FIG. 3, and in the low speed region the operating point of the induction motor is located at the point $P_1$ on the straight line a, high torque $T_{13}$ is obtained in the high speed region and low torque $T_{11}(T_{13} > T_{11})$ in the low speed region.

Figure 5:
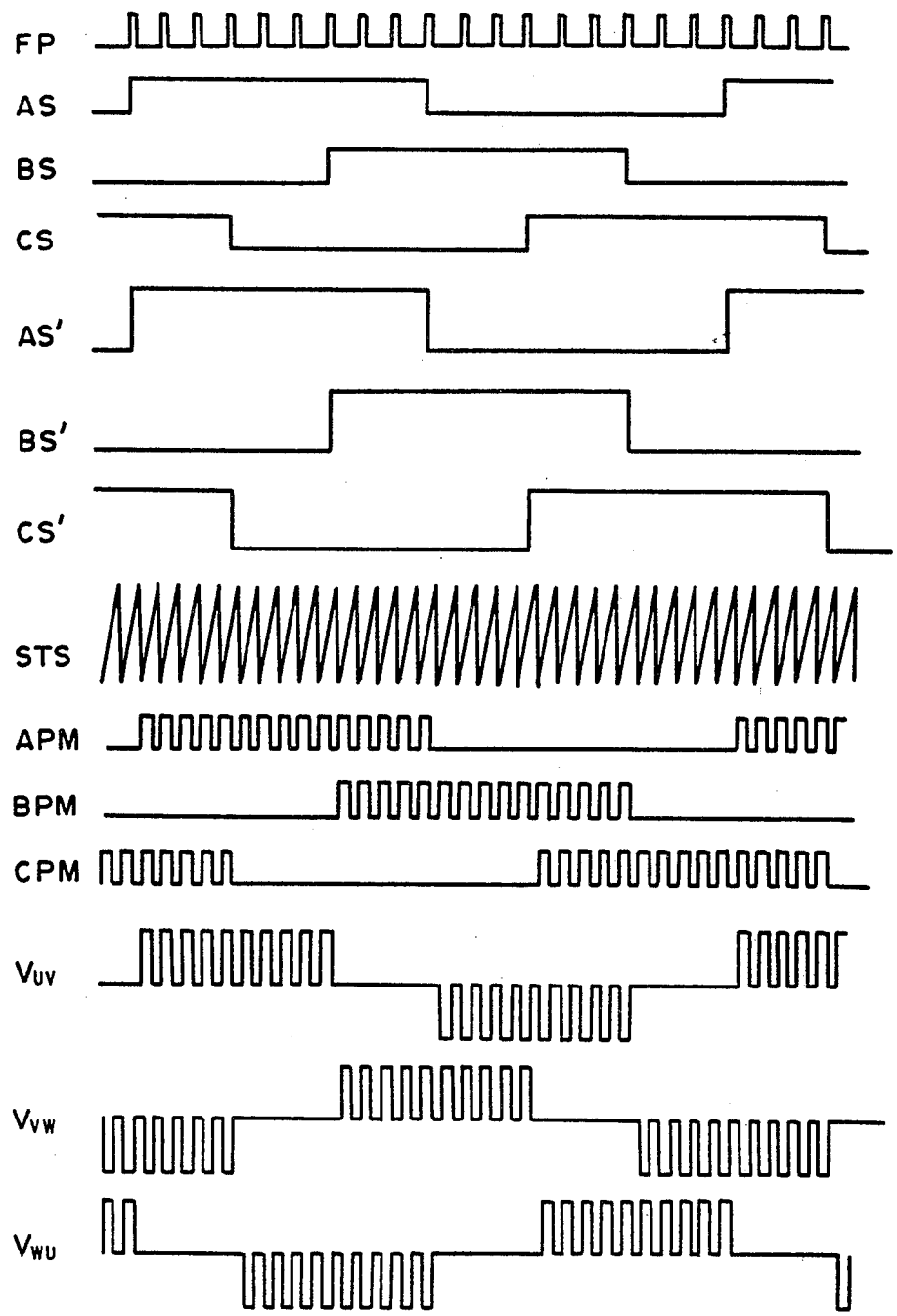
FIG. 5 is a timing chart showing each of the signal waveforms associated with the induction motor drive apparatus of FIG. 4.

FIG. 4 is a circuit block diagram of an induction motor drive apparatus, FIG. 5 is a timing chart of the associated waveforms, and FIG. 6 is a table useful in explaining the operation of a ring counter.

Referring now to FIG. 4, a three-phase AC power source 1 supplies sinusoidal, three-phase AC power to a full-wave rectifier circuit 2 comprising diodes $D_1$ through $D_6$ and adapted to produce a DC voltage by full-wave rectifying the three-phase AC voltage. An inverter circuit 3 comprising power transistors $Q_1$ through $Q_6$ and diodes $D'_1$ through $D'_6$ receives the full-wave rectified DC voltage from full-wave rectifier 2 and converts this voltage to a three-phase AC voltage which has a stepped, nearly sinusoidal waveform whose frequency and effective value can be changed by controlling the on-off timing of the power transistors $Q_1$ through $Q_6$. A three-phase induction motor 4 has a shaft which mounts a speed detector 5 such as a tachometer generator, the latter being adapted to generate an analog voltage which is proportional to the rotational speed $V_n$ of the motor. A speed command circuit 6 supplies to an analog adder 7 an analog voltage which is proportional to a command speed $V_N$, the adder 7 producing an output voltage which is proportional to a speed deviation $V_s (= V_N − V_n)$ between the command speed $V_N$ and the actual speed $V_n$. A quantity s called "slip" is defined as a variable that represents the speed deviation of the induction motor, and is obtained by the following equation $$s = (V_{sn} − V_n)/V_{sn} \ldots \qquad (2)$$

where $V_{sn}$ is the synchronous speed of the motor and $V_n$ the actual speed thereof. Thus if the command speed $V_N$ obtained from the speed command circuit 6 is considered to be the synchronous speed $V_{sn}$, the output voltage of the analog adder 7 can be considered as being proportional to the slip s.

Figure 7:
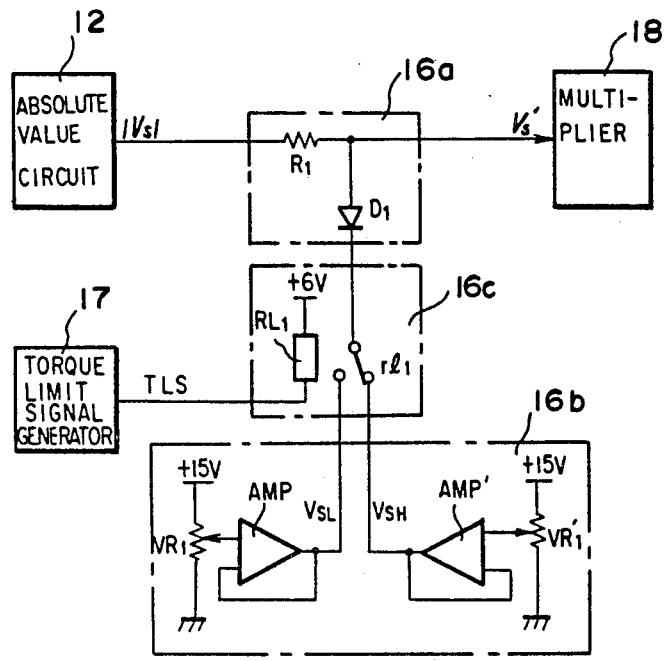
FIG. 7 is an embodiment of an amplitude control circuit in FIG. 4.
Figure 8:
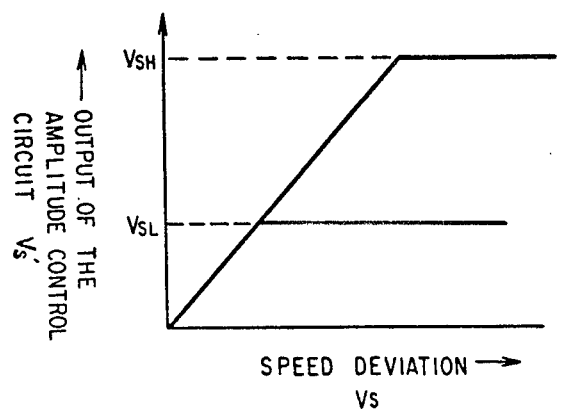
FIG. 8 is a graph useful in explaining input-output characteristics of an amplitude control circuit in FIG. 7.
Figure 9:
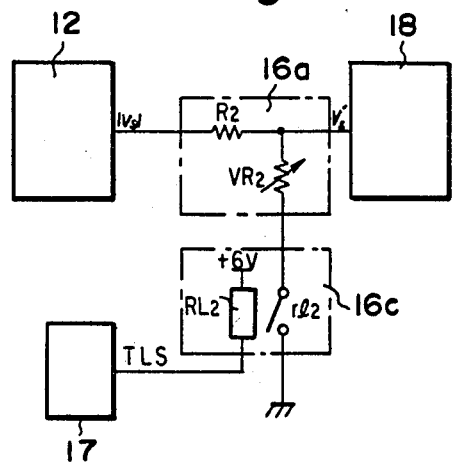
FIG. 9 is another embodiment of an amplitude control circuit in FIG. 4.
Figure 10:
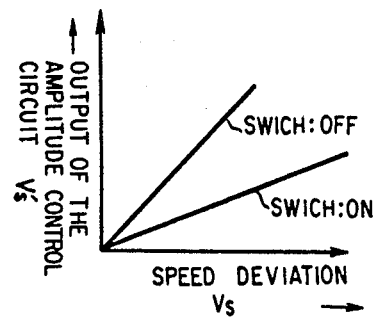
FIG. 10 is a graph useful in explaining input-output characteristics of an amplitude control circuit in FIG. 9.

An error amplifier 8 amplifies the speed deviation signal $V_s$, d polarity discriminator 9 produces a rotational direction signal RDS indicating the rotational direction of the induction motor 4, and the slip signal generator 10 generates a slip signal $V_{so}$ having a positive or negative constant voltage corresponding to the rotational direction of the induction motor 4. An adder 11 adds together actual speed $V_n$ and slip signal $V_{so}$. An absolute value circuit 12 produces an output which is the absolute value of the speed deviation $V_s$ $(= V_N − V_n)$, and an absolute value circuit 13 produces an output which is the absolute value of the signal $(V_n + V_{so})$ acquired from the analog adder 11. A voltage-frequency converter 14 produces a pulse train FP whose frequency is proportional to the output voltage $V_F$ delivered by the absolute value circuit 11. A ring counter 15 has three flip-flop stages which produce three-phase rectangular signals AS, BS and CS successively displaced in phase by $2\pi/3$. More specifically, if the set outputs of the respective flip-flops are designated $F_1$, $F_2$ and $F_3$, the state of the $F_1$ to $F_3$ outputs will change as shown in FIG. 6 every time a signal pulse FP is generated by the voltage-frequency converter 14. Accordingly, if the set outputs $F_1$, $F_2$, $F_3$ of the respective flip-flops are delivered in the mentioned order, the three-phase rectangular signals AS, BS and CS will be produced successively displaced in phase by $2\pi/3$. The direction in which each of the flip-flops undergoes a change in state is shown by the arrow A in FIG. 6 if the induction motor 4 is rotating in the forward direction, that is, if rotational direction signal RDS of the output of polarity discriminator 9 is at logic "1", and by the arrow B if the motor is rotating in the reverse direction. In other words, the direction of phase rotation of the three-phase rectangular signals AS, BS, CS is determined by the output of the polarity discriminator circuit 9. Amplitude control circuit 16 limits the amplitude of the speed deviation signal below a prescribed clamp voltage and includes a limiter 16a, a clamp voltage setting circuit 16b setting the clamp voltage and a switching circuit 16c for making the function of the limiter effective by the torque limit signal TLS generated from a torque limit signal generation 17. FIG. 7 is an embodiment of an amplitude control circuit 16, showing resistor $R_1$, diode $D_1$, relay $RL_1$, relay contact $rl_1$, variable resistors $VR_1$, $VR_1'$ and amplifiers AMP, AMP'. The relay $RL_1$ is driven when the torque limit signal TLS or an orientation signal is generated. In the case that the relay is not driven, the relay contact $rl_1$ assumes the state shown in FIG. 7. Hence, the high clamp voltage $V_{SH}$ obtained by adjusting the variable resistor $VR_1'$ is impressed to the anode of the diode $D_1$. If the speed deviation $V_S$ is smaller than the clamp voltage $V_{SH}$, the diode $D_1$ is reversely biased and in response $V_S$ is produced as an output and if $V_S$ is larger than $V_{SH}$, $V_{SH}$ is produced as an output. On the other hand, in the case that the relay is driven by the orientation signal, the low clamp voltage $V_{SL}$ ($V_{SL}<V_{SH}$) obtained by adjusting the variable resister $VR_1$ is impressed to the anode of the diode $D_1$. Therefore, if the inequality $V_S<V_{SL}$ is satisfied, $V_S$ is produced as an output and if $V_S \geq V_{SL}$ is satisfied, $V_{SL}$ is produced as an output. Above all, the amplitude of the speed deviation signal is limited under the prescribed low clamp voltage $V_{SL}$ in the orientation mode (the orientation signal is "1"). FIG. 8 is a graph useful in explaining the input ($V_S$) − output ($V'_S$) characteristic of the amplitude control circuit 16 of FIG. 8. FIG. 9 is another embodiment of an amplitude control circuit 16, showing a resistor $R_2$, a variable resister $VR_2$, relay $RL_2$, and relay contact $rl_2$. The relay $RL_2$ is driven when the torque limit signal TLS or the orientation signal has logic value "1". In the case the relay is not driven, the output $V_S$ of the absolute value circuit 12 is generated as an output and in the case the relay is driven, the output $V_S$ is divided by the resistor $R_2$ and the variable resistor $VR_2$ and $V_S \cdot (R_2/(R_2+VR_2))$ is generated as an output. FIG. 10 is a graph useful in explaining the input ($V_S$) − output ($V_S'$) characteristic of the amplitude control circuit in FIG. 9.

An analog multiplier 18 multiplies the speed deviation $V_S'$ by the frequency command signal VF from the absolute value circuit 13 and in response produces a primary voltage command signal $V_E(=V_S'\cdot V_F)$. Here, the amplitude of the primary voltage command signal $V_E$ is shown by using $V_S'$ as follows.

$$V_E = V_S' \cdot V_F = V_S' \cdot (V_{SO} + V_n)$$

$$= V_S' \cdot (V_{SO} + V_N - V_S) \simeq V_N \cdot V_S'$$

Figure 11:
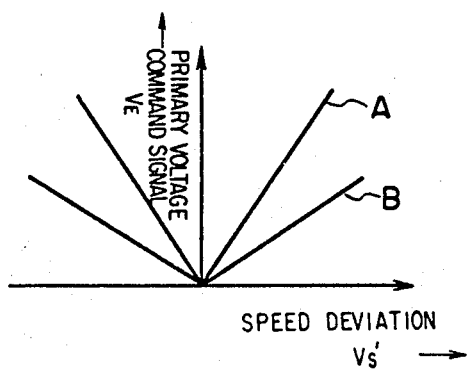
FIG. 11 is a graph for explaining primary voltage command signal versus speed deviation characteristics in FIG. 4.

Accordingly, in the high speed region the $V_E-V_S'$ characteristic assumes a straight line A in FIG. 11 and in the low speed region the $V_E-V_S'$ characteristic assumes a straight line B. And since the effective value of the primary voltage supplied to the induction motor is decided by the primary voltage command signal $V_E$ as described hereinafter, the driving torque in the low speed region becomes smaller than that in the high speed region. A full-wave rectifier 19 comprising diodes $D_1''$ through $D_6''$ full-wave rectifies the three-phase AC voltage obtained from the inverter 3. A low-pass filter 20 comprising resistors $R_1$, $R_2$ and a capacitor C is adapted to level the ripple contained in the DC voltage as rectified and delivered by the full-wave rectifier 19. An adder 23 is adapted to subtract from the output of multiplier 18 the output from an amplifier 21. An analog multiplier 24 is adapted to multiply the rectangular wave signals AS, BS, CS by the output of an amplifier 22 and in response produces three-phase rectangular wave signals AS', BS', CS' whose amplitudes conform to the speed deviation $V_S'$ and the frequency command signal $V_F$.

A saw-tooth oscillator circuit 25 produces a saw-tooth signal STS having a period which is considerably shorter than that of the three-phase rectangular signals AS', BS', CS'. Comparators 26a, 26b, 26c compare the amplitude of the saw-tooth signal STS with those of the three-phase rectangular signals AS', BS', CS' and each produces an output at logic "1" if the amplitude of its AS', BS' or CS' input is the greater. In other words, the saw-tooth oscillator circuit 25, multiplifer 24 and comparators 26a, 26b, 26c construct a pulse width modulator circuit which is adapted to provide phase control signals APM, BPM, CPM (comprising three-phased waveforms with a rectangular envelope of controlled amplitude) which consist of the respective rectangular signals AS', BS', CS' after they have been modulated in pulse width in accordance with their amplitudes. NOT gates are designated at $NOT_1$ through $NOT_3$ and driver circuits at 27 through 32, the latter supplying their outputs to the respective bases of the power transistors $Q_1$ through $Q_6$ that construct the inverter circuit 3.

A description of the operation of the system shown in FIG. 4 will now follow with reference being had to the timing chart of FIG. 5, for the two following cases (a) and (b) below.

(a) Speed control of the induction motor

If the induction motor 4 is rotating in the forward direction with a prescribed speed deviation, a change in load will give rise to a change in the actual speed $V_n$ of the motor, the latter conforming to the increase or decrease in the load. Let us now assume that the load increases, giving rise to a drop in the actual speed $V_n$. The actual motor speed $V_n$ is detected by the tachometer generator 5 which produces an output voltage proportional thereto. The adder 7 operates on the speed command signal $V_N$ being provided by the speed command circuit 6 and the actual motor speed $V_n$ supplied by the tachometer generator to produce an output signal representative of the difference $V_S(=V_N-V_n)$. This signal is supplied to the absolute value circuit 12 and the polarity discriminator circuit 9 which act upon the signal to divide into an absolute value signal $V_S$ and a rotational direction signal RDS. This absolute value signal $V_S$ is then applied to the amplitude control circuit 16 which controls the amplitude of the signal $V_S$ as described above in connection with the FIG. 7. The rotational direction signal RDS is supplied to both the slip signal generator 10 and ring counter 15. The slip signal generator 10 generates a slip signal $V_{SO}$ having a positive or negative constant voltage corresponding to the rotational direction of the induction motor, that is, logical value of the rotational direction signal RDS. Herein, the amplitude of the slip signal $V_{SO}$ is adjusted to be equal with that of the speed deviation $V_S$ at the time when the induction motor 4 rotates in the steady-state. The adder 11 adds together the slip signal $V_{SO}$ and the actual speed $V_n$ and in response produces the frequency command signal $V_F$ via the absolute value circuit 13. On the other hand the frequency command signal $V_F$ is then supplied to the voltage-frequency converter 14 which converts the signal $V_F$ into a pulse train FP whose frequency is proportional thereto. The ring counter 15 receives the rotational direction signal RDS being supplied by the polarity discriminator 9 and the pulse train FP being provided by voltage-frequency converter 14, and in response thereto produces the three-phase rectangular voltage signals AS, BS, CS which, in addition to having a fixed peak value, are proportional in frequency to the frequency command signal $V_F$ and exhibit the prescribed phase rotation directions as described above. The signals AS, BS, CS are in turn delivered to multiplier 24.

Meanwhile the speed deviation $V_S'$ delivered by the amplitude control circuit 16, together with the frequency command signal $V_F$ from the absolute value circuit 13, is used to produce a primary voltage command signal $V_E$ for effecting variable voltage control. To this end, the signals $V_S'$ and $V_F$ are multiplied together in the analog multiplier 18 which produces the primary voltage command signal $V_E$ whose magnitude is the product $V_S' \cdot V_F$ supplied by multiplier 18. With the induction motor 4 continuing to rotate under the command speed $V_N$ and the prescribed speed deviation, a heavier load will enlarge the speed deviation $V_S'$ and therefore increase the amplitude of the primary voltage command signal $V_E$.

In parallel with the foregoing circuit operation, the three-phase AC voltages $V_{UV}$, $V_{VW}$, $V_{WU}$ from the inverter circuit 3 are being full-wave rectified by the full-wave rectifier 19. Low-pass filter 20 levels the ripple contained in the DC voltage provided by the full-wave rectification and produces an output voltage which is proportional to the total error resulting from voltage fluctuation in the three-phase power source 1 as well as error in the phase control system that drives the inverter 3. The adder 23 operates on the primary voltage command signal $V_E$ and the DC voltage provided by the low-pass filter 20 and calculates their difference. In other words, the primary voltage command signal $V_E$ is corrected in accordance with the error which results from voltage fluctuation and the error in the phase control system. The corrected primary voltage command signal, now known as $V_E'$, is applied to the analog multiplier 24 via the amplifier 22 which, since it is receiving the three-phase rectangular signals, AS, BS, CS, multiplies the signals AS, BS, CS by the primary voltage command signal $V_E$40 to produce three-phase rectangular signals AS', BS', CS' which conform in amplitude to the product of the speed deviation signal $V_S'$ and the frequency command signal $V_F$ and which are proportional in frequency of the envelope to the frequency command signal $V_F$.

The comparators 26a, 26b, 26c compare the peak values of the respective rectangular signals AS', BS', CS' with the amplitude of the saw-tooth wave STS being provided by the saw-tooth oscillator 25, and each comparator is adapted to produce a logic "1" output if the amplitude of its AS', BS' or CS' input is greater than the saw-tooth amplitude. In this manner the comparators 26a, 26b, 26c produce the phase control signals APM, BPM, CPM of three phases, the signals being modulated in pulse width in accordance with the amplitude of each rectangular wave signal AS', BS', CS'. Here it should be noted that the effective voltage value of each phase control signal APM, BPM, CPM is proportional to the product of the speed deviation $V_S'$ and the frequency command signal $V_F$ because the amplitude of each of the rectangular signals AS', BS', CS' is proportional to the product of $V_S'$ and $V_F$. In addition, the frequency of each of the phase control signals APM, BPM, CPM is proportional to the frequency command signal $V_F$ from the fact that the frequency of the signals AS', BS', CS' is proportional thereto.

The NOT gates $NOT_1$ through $NOT_3$ and driver circuits 27 through 32 use the phase control signals APM, BPM, CPM to produce drive signals APM', *APM', BPM', *BPM', CPM', *CPM' for controlling the on-off operation of the power transistors $Q_1$ through $Q_6$ in inverter circuit 3. These drive signals drive the power transistors $Q_1$ through $Q_6$ in a sequential manner so that the inverter circuit 3 will produce the stepped AC voltages $V_{UV}$, $V_{VW}$, $V_{WU}$ which have been modulated in pulse width. These three-phase voltages $V_{UV}$, $V_{VW}$, $V_{WU}$ are applied as primary voltages to the induction motor 4 and serve to control its speed. At this time the effective value $E_1$ of the three-phase voltages $V_{UV}$, $V_{VW}$, $V_{WU}$ is proportional to both the speed deviation $V_S'$ and frequency command signal $V_F$, and the primary frequency $f_1$ thereof is proportional to the frequency command signal $V_F$. Accordingly, if the speed deviation $V_S'$ is constant, the effective value $E_1$ of the primary voltage and the primary frequency $f_1$ will be proportional to each other. The speed of induction motor 4 will therefore be regulated in accordance with VVVF control.

The operation described above is normally repeated until the speed deviation between the actual speed $V_n$ and the command speed $V_N$ attains the prescribed speed deviation value. Moreover, it should be particularly noted that the effective value of the three-phase AC voltages $V_{UV}$, $V_{VW}$, $V_{WU}$ is dependent upon the speed deviation $V_S$. In addition, the speed deviation is approximately proportional to the degree of load fluctuation. Hence, if the actual speed drops, i.e., the speed deviation $V_S'$ increases, owing to an increase in load, the effective value $E_1$ of primary voltage $V_{UV}$, $V_{VU}$, $V_{WU}$ becomes larger than the value decided by the VVVF control, whereby the generated torque is increased. On the other hand, if the actual speed rises, or the speed deviation $V_S$ decreases, owing to a decrease in the load, the effective value $E_1$ of primary voltage $V_{UV}$, $V_{VU}$, $V_{WU}$ becomes smaller than the value decided by VVVF control, whereby the generated torque is decreased.

Figure 12:
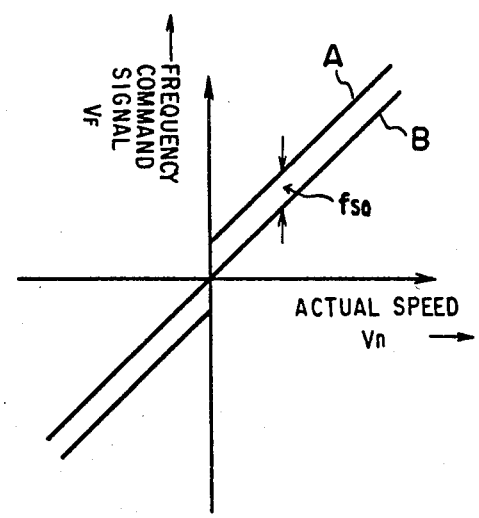
FIG. 12 is a graph for explaining frequency command signal versus actual speed of the induction motor.

Now, it is noted that the amplitude of the slip signal $V_{SO}$ is kept to be constant every time, although the actual speed of the induction motor varies. This control results in secure and smooth rotation of the induction motor 4. FIG. 12 is a graph for explaining the frequency command signal $V_F$ versus the actual speed $V_n$. In FIG. 12, a straight line B shows the primary frequency corresponding to the actual speed $V_n$ only and a straight line A shows the primary frequency obtained by adding together the frequency in proportion to the slip signal $V_{SO}$ and the frequency in proportion to the actual speed $V_n$. The present invention adopts the frequency command signal $V_F$ on the basis of the characteristics of line B.

(b) The second case considered will be the motor control in the orientation mode.

An operation mode has to be changed from the cutting mode to the orientation mode only in the stop condition of the induction motor. So, after the motor ceases to rotate, the torque limit signal generator 17 generates the orientation signal which is equivalent to the torque limit signal TLS and the speed command circuit 6 instructs a command speed $V_N$ being smaller than that in the cutting mode. The orientation signal makes the limiter 16a function to limit the speed deviation $V_S$ under a prescribed clamp voltage $V_{SL}$ set by the clamp voltage setting circuit 16b.

In the steady-state, the speed deviation is maintained to be a constant small value and the induction motor rotates in the low speed corresponding to the command speed. Therefore, an inequality $V_S < V_{SL}$ is met and the limiter 16a produces $V_S$ as an output resulting in a small value of the primary voltage command signal $V_E$.

After the motor continues to rotate in the steady-state, a pin projecting from the spindle of the machine strikes a stoppage portion resulting in the stopping of the rotation of the motor. Now, at the position where the pin strikes the stoppage portion, the cutting portion formed on the tool faces to the one formed on the spindle and thereafter the tool is mounted on the spindle fixedly. Here, since the actual speed $V_n$ is zero when the motor ceases to rotate, the frequency command signal $V_F$ becomes equal to slip signal $V_{SO}$. On the other hand, the speed deviation $V_S(=V_N-V_n=V_N)$ becomes maximum resulting in that $V_S$ is larger than the low clamp voltage $V_{SL}$. The limiter functions to limit the speed deviation and produces $V_{SL}$ as an output.

The frequency command signal $V_F$ is then rendered equal to the slip signal $V_{SO}$ and the primary voltage command signal $V_E$ is rendered equal to $V_{SL} \cdot V_{SO}$. As a result, the primary voltage impressed on the induction motor is limited and also the generated torque is limited so as not to damage the spindle.

In accordance with the present invention as described above, the induction motor can be utilized as a spindle motor that required to rotate in a low torque and low speed region, and further it is possible to mount a tool on the spindle without damaging this spindle etc.

What we claim is:

1. An induction motor drive apparatus comprising:
    an inverter for converting DC voltage into three-phase AC primary voltage;
    an induction motor driven by the three-phase AC primary voltage;
    speed command means for providing a command speed $V_N$ to the induction motor;
    actual speed detecting means for detecting the actual speed $V_n$ of the induction motor;
    speed deviation signal generating means for generating a speed deviation signal based on the difference between the command speed $V_N$ and the actual speed $V_n$ of the induction motor;
    primary voltage signal generating means for generating a primary voltage command signal $V_E$ for controlling the amplitude of said three-phase AC primary voltage;
    primary frequency signal generating means for generating a primary frequency command signal $V_F$ corresponding to the frequency of said three-phase AC primary voltage;
    rectangular wave signal generating means for producing three-phase rectangular wave signals of a frequency which conforms to the primary frequency command signal $V_F$ and of an amplitude conforming to the primary voltage command signal $V_E$;
    pulse forming means for converting each said rectangular wave into a series of closely spaced pulses and for modulating in width each said pulse of each of the three-phase rectangular wave signals in accordance with the magnitude of the primary voltage command signal $V_E$; and
    means for applying said width-modulated closely spaced pulses selectively to said inverter to produce said three-phase AC primary voltage from said DC voltage for driving said induction motor;
    wherein the primary frequency command signal $V_F$ generating means comprises:
        constant speed signal generating means for generating a constant speed signal $V_{so}$ of a predetermined constant value and with a polarity determined by the polarity of the speed deviation signal; and
        adding means for generating the primary frequency command signal $V_F$ by adding the respective constant speed signal $\pm V_{so}$ to the actual speed $V_n$ of the induction motor and for outputting the absolute value of this sum; and
    the primary voltage command signal $V_E$ generating means comprising:
        means for forming the absolute value $|V_s|$ of the speed deviation signal;
        torque limit signal generating means for selectively generating a torque limit signal for selectively operating said motor in a low-torque mode;
        amplitude control means for selectively limiting the absolute value of the speed deviation signal $|V_s|$ and for outputting the selectively limited value $|V_s'|$ in response to the torque limit signal; and
        a multiplier for generating the primary voltage command signal $V_E$ by multiplying the selectively limited output $|V_s'|$ of the amplitude control means by said primary frequency command signal $V_F$ for determining said amplitude of said rectangular wave signals.

2. The apparatus of claim 1, said amplitude control means comprising:
    a limiter for limiting the absolute value of the speed deviation signal below a clamp voltage;
    a clamp voltage setting circuit for setting the clamp voltage; and
    a switching circuit responsive to the torque limit signal to render the limiter operational.

3. The apparatus of claim 1, said amplitude control means comprising:
    a voltage divider for dividing the voltage of the speed deviation signal; and
    a switching circuit responsive to the torque limit signal to render the voltage divider operational.

4. The apparatus of claim 1, 2 or 3, said speed command signal $V_N$ corresponding to the synchronous speed and said speed deviation signal corresponding to the slip speed of said induction motor.

5. The apparatus of claim 1, 2 or 3, the frequency of said rectangular wave signals being proportional to said primary frequency command signal $V_F$ and the amplitude of said rectangular wave signals being proportional to said primary voltage command signal $V_E$ in both the normal mode of operation and in the low-torque mode of operation of said apparatus.

6. The apparatus of claim 1, 2 or 3, comprising a full wave rectifier and a low-pass filter for deriving the effective primary voltage applied to said induction motor, and means for comparing same with the primary voltage command signal $V_E$ to control said amplitude of said rectangular wave signals according to the difference therebetween.

7. The apparatus of claim 5, comprising a full wave rectifier and a low-phase filter for deriving the effective primary voltage applied to said induction motor, and means for comparing same with the primary voltage command signal $V_E$ to control said amplitude of said rectangular wave signals according to the difference therebetween.

8. The apparatus of claim 1, 2 or 3, comprising means including a ring counter for generating said three-phase rectangular wave signals in an order determined by the polarity of the speed deviation signal.

9. The apparatus of claim 6, comprising means including a ring counter for generating said three-phase rectangular wave signals in an order determined by the polarity of the speed deviation signal of the induction motor.

10. The apparatus of claim 1, 2 or 3, said motor being connected for turning a spindle of a machine and said spindle holding a tool, said apparatus comprising means for generating an orientation signal to act as the torque limit signal during said low torque mode of operation when the tool is to be mounted on the spindle.

11. The apparatus of claim 6, said pulse forming means for modulating the width of each said closely spaced pulse comprising:
  a saw-tooth generator circuit for generating a saw-tooth signal whose frequency is higher than that of the rectangular wave signals; and
  a comparator for comparing the level of each rectangular wave signal with the level of the saw-tooth signal, and for producing the closely spaced pulse-width modulated pulses based on the result of the level comparison.

12. An apparatus for operating an inverter driving an AC induction motor selectively in normal- and low-torque modes of operation by selectively setting in said normal-torque mode of operation the approximate torque in said normal mode of operation by controlling approximately proportionally the amplitude and frequency of rectangular envelopes of three-phase waveforms applied to the inverter for driving the induction motor from a rectified power source, said apparatus comprising
  command speed means for setting a command speed for said motor,
  amplitude-adjusting means for constituting said waveform envelope of closely-spaced pulses and for modulating same in width and height to affect said envelope amplitude, and
  frequency-setting means for setting said frequency of said envelopes proportionally with the actual speed of said induction motor, said proportionality including a preselected minimum constant frequency at zero motor speed,
  said amplitude-adjusting means including means for generating and multiplying the absolute value of a speed deviation signal which is proportional to the difference between the actual and commanded speeds by a signal corresponding to said frequency of said envelopes, and
  amplitude control means for limiting said absolute value of the speed deviation signal during said low-torque mode of operation.

13. The apparatus of claim 12, said amplitude control means comprising
  a limiter for limiting the absolute value of the speed deviation signal below a clamp voltage,
  a clamp voltage setting circuit for setting the clamp voltage, and
  a switching circuit responsive to the torque limit signal to render the limiter operational.

14. The apparatus of claim 12, said amplitude control means comprising
  a voltage divider for dividing the voltage of the speed deviation signal, and
  a switching circuit responsive to the torque limit signal to render the voltage divider operational.

* * * * *

UNITED STATES PATENT AND TRADEMARK OFFICE
CERTIFICATE OF CORRECTION

PATENT NO. : 4,322,671
DATED : 30 March 1982
INVENTOR(S) : KAWADA et al

It is certified that error appears in the above—identified patent and that said Letters Patent is hereby corrected as shown below:

Column 1, line 39, after "because" insert --it allows--.
Column 4, line 52, delete "d";
 line 58, after "together" insert --the--;
 after "and" insert --the--.
Column 5, line 41, "resister" should be --resistor--;
 line 50, "8" should be --7--.
Column 6, line 36, "multiplifer" should be --multiplier--.
Column 7, line 65, "40" should be --'--.
Column 9, line 52, after "that" insert --is--.
In Fig. 3, "a" should be --c--; "c" should be --a--.
In Fig. 4, the inverter in the lower right hand
 corner labelled "NOT" should be labelled
 --NOT$_1$--.
In Fig. 10, both occurrence of "SWICH" should be --SWITCH--.

Signed and Sealed this

Twentieth Day of July 1982

[SEAL]

Attest:

GERALD J. MOSSINGHOFF

Attesting Officer      Commissioner of Patents and Trademarks